(12) United States Patent
Chung et al.

(10) Patent No.: US 9,558,289 B2
(45) Date of Patent: Jan. 31, 2017

(54) SECURELY RENDERING ONLINE ADS IN A HOST PAGE

(75) Inventors: Wook Jin Chung, Kirkland, WA (US); Gupta Garuda, Redmond, WA (US); Spencer Wong Low, Redmond, WA (US); Chad Steven Estes, Woodinville, WA (US); William Winter, Seattle, WA (US); David Immanuel Millet, Kirkland, WA (US); Tomoko Kwan, Bothell, WA (US); Philip Edward Hiatt, Seattle, WA (US); Rahul Sudhir Kumar, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 12/895,286

(22) Filed: Sep. 30, 2010

(65) Prior Publication Data
US 2012/0084641 A1 Apr. 5, 2012

(51) Int. Cl.
*G06F 17/00* (2006.01)
*G06F 17/30* (2006.01)
*G06Q 30/02* (2012.01)

(52) U.S. Cl.
CPC ..... *G06F 17/30893* (2013.01); *G06F 17/3089* (2013.01); *G06Q 30/0241* (2013.01)

(58) Field of Classification Search
CPC .................................................. G06F 17/3089
USPC ......................................................... 715/240
See application file for complete search history.

(56) References Cited

U.S. PATENT DOCUMENTS

| 6,720,979 | B1 * | 4/2004 | Shrader .................. G06T 13/80 345/473 |
| 7,958,516 | B2 * | 6/2011 | Buerge et al. ................ 719/318 |
| 9,120,013 | B1 * | 9/2015 | Daniel .................. G07F 17/326 |
| 2002/0046401 | A1 * | 4/2002 | Miyazaki ........... H04N 7/17318 725/32 |
| 2002/0052925 | A1 | 5/2002 | Kim et al. |
| 2004/0199603 | A1 * | 10/2004 | Tafla ................. G06F 17/30899 709/217 |
| 2007/0055748 | A1 | 3/2007 | Kim et al. |
| 2007/0101258 | A1 | 5/2007 | Xu et al. |

(Continued)

FOREIGN PATENT DOCUMENTS

WO 2009148981 A2 12/2009

OTHER PUBLICATIONS

Sirmakessis, Dr. Spiros, "Transforming Web Surfers to E-Shoppers"—Published Date: Dec. 7-9, 2001, PC-HCI 2001 Workshop, http://www.hci.gr/files/PC_HCI_Workshop_2001_Proceedings.pdf.

Jackson; et al., "Subspace: Secure CrossDomain Communication for Web Mashups"—Published Date: 2007, Track: Security, Privacy, Reliability, and Ethics, Session: Defending Against Emerging Threats, http://citeseerx.ist.psu.edu/viewdoc/download?doi=10.1.1.81.3283&rep=rep1&type=pdf.

(Continued)

*Primary Examiner* — Laurie Ries
(74) *Attorney, Agent, or Firm* — Daniel Choi; Micky Minhas (57) ABSTRACT

One or more techniques and/or systems are disclosed for rendering online ads on a webpage. A first inter-frame communication channel is created, which comprises a first communication channel between a first cross-domain frame and a host page, such as the webpage. The first cross-domain frame comprises content from a domain that is different than that of the host page domain. A second inter-frame communication channel is created comprising a second communication channel between the first cross-domain frame and a second cross-domain frame in the host page.

20 Claims, 8 Drawing Sheets

(56) References Cited

U.S. PATENT DOCUMENTS

| | | | |
|---|---|---|---|
| 2007/0174774 A1* | 7/2007 | Lerman | G06F 17/30017 715/723 |
| 2007/0299857 A1* | 12/2007 | Gwozdz et al. | 707/102 |
| 2007/0300064 A1* | 12/2007 | Isaacs et al. | 713/168 |
| 2008/0034441 A1* | 2/2008 | Saha et al. | 726/27 |
| 2008/0226253 A1* | 9/2008 | Steinberg | H04N 5/272 386/278 |
| 2009/0030785 A1 | 1/2009 | Goyal et al. | |
| 2009/0037806 A1* | 2/2009 | Yang et al. | 715/234 |
| 2009/0144129 A1* | 6/2009 | Grouf | G06F 17/3005 705/14.42 |
| 2009/0300496 A1 | 12/2009 | Fan et al. | |
| 2009/0327869 A1 | 12/2009 | Fan et al. | |
| 2010/0094860 A1* | 4/2010 | Lin | G06Q 30/0277 707/709 |
| 2010/0100415 A1 | 4/2010 | Plummer et al. | |
| 2011/0112914 A1* | 5/2011 | Geer, III | G06Q 30/00 705/14.73 |
| 2011/0161990 A1* | 6/2011 | Smith et al. | 719/328 |
| 2011/0296452 A1* | 12/2011 | Yu | H04H 60/37 725/9 |
| 2012/0059713 A1* | 3/2012 | Galas | G06Q 30/0244 705/14.49 |
| 2012/0233540 A1* | 9/2012 | Collet | G06F 17/2247 715/234 |

OTHER PUBLICATIONS

Louw; et al., "AdJail: Practical Enforcement of Confidentiality and Integrity Policies on Web Advertisements"—Retrieved Date: Sep. 15, 2010, pp. 1-17 http://www.usenix.org/events/sec10/tech/full_papers/TerLouw.pdf.

Barth; et al., "Securing Frame Communication in Browsers"—Retrieved Date: Sep. 15, 2010, pp. 1-14, http://www.adambarth.com/papers/2008/barth-jackson-mitchell.pdf.

International Search Report, Mailed Date: May 24, 2012, Application No. PCT/US2011/051140, Filed Date: Sep. 11, 2011, pp. 8.

Int. Preliminary Report cited in PCT Application No. PCT/US2011/051140 dated Apr. 2, 2013, 4 pgs.

Reply Chinese Office Action cited in Chinese Application No. 201110293145.1 dated Aug. 16, 2013, 10 pgs.

Second Chinese Office Action cited in Chinese Application No. 201110293145.1 dated Jan. 15, 2014, 2 pgs.

Chinese Search Report cited in Chinese Application No. 201110293145.1 dated May 8, 2013, 2 pgs.

Reply Second Chinese Office Action cited in Chinese Application No. 201110293145.1 dated Feb. 25, 2014,1 pg.

Third Chinese Office Action cited in Chinese Application No. 201110293145.1 dated Jul. 7, 2014, 2 pgs.

Reply/Claims Third Chinese Office Action cited in Chinese Application No. 201110293145.1 dated Oct. 17, 2014, 10 pgs.

* cited by examiner

SECURELY RENDERING ONLINE ADS IN A HOST PAGE

BACKGROUND

In a computing environment, websites and associated webpages often host online advertisements, intended to be viewed by online users of the respective websites. Online advertisements typically come from a different domain than that of the hosting website, for example, where the hosting website utilizes their servers to provide the website, and ad syndicators utilize their servers to provide ad content. Online advertisers and hosting websites typically work with the ad syndicator, which takes calls for ads from the host, pulls ads from the advertiser, and then directs the ads to the host's website. Often, online ads have rich media functionality, including an ability to expand, move about a webpage, and/or show rich media interaction between multiple ads.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Typically, when a host website wishes to display an online ad in a webpage, the webpage (hosting webpage) can call to an ad syndicator, indicating specifications for an open ad-space in the host webpage. As an example, an ad can be called by a browser on the user's client (e.g., locally). Similarly, an ad can be called by the hosting webpage's server (e.g., remotely) to an ad syndicator's server, where script for the ad is then delivered to the user via the webpage. The ad syndicator can pull an ad from a catalogue of ads supplied by advertisers, which meets the specifications supplied by the host webpage. Often, the ad syndicator will load script for a selected ad directly into the script of the host webpage, in such a way that the browser treats the script for the ad content as a part of the host webpage's script. When this occurs, the ad is often allowed to freely interact with the host webpage in order to provide for rich functionality, including expanding or contracting, changing its position, spawning child advertisements, and/or interacting with other ads on the host webpage.

However, inserting the ad script in this manner also grants the ad many if not all privileges that the host webpage may have in the browser. Unfortunately, malicious ads may also be inserted into the host webpage in this manner, creating an opportunity to damage a host website, or steal users' personal identifiable information. Further, some ads may not function properly if the webpage is updated with different script and the ad script has not been updated to work with new host webpage. Additionally, a webpage host may be able to take advantage of an ad owner by manipulating the ad content inside the browser, such as by inflating the number of times an ad appears to have been clicked on by a user, for example (e.g., where the ad owner pays the webpage host based on the number of clicks).

As an illustrative example, a webmail system may host a third-party advertisement, such as provided by the ad syndicator. The ad may be integrated by the ad syndicator in a way that allows the ad to freely expand out or fly around the host webpage, and even spawn and interact with child ads. However, this ad also has a potential to view users' emails on the hosting page, and to steal user credentials from the host website's cookies, for example. Further, from the perspective of protecting an ad owner, a host could charge an ad owner more where the host programmatically increases the number of times an ad appears to have been clicked on by a user.

Additionally, ad developers typically have to understand the host webpage's publisher to write ad execution code that does not conflict with the host page, particularly with the rich media development of online ads. When a host page publisher updates the content, functionality or other elements of the page, this problem become exacerbated as the ad developer's execution code may no longer properly function with the newly updated code. One solution is to inform the ad developer, who develops new code for the ad, then runs it through testing and recertification for the page. However, this process can be onerous, time consuming and expensive.

Previous and current solutions to ad serving security issues have limitations that may not make them as functional, or provide for extensive proprietary updates to users, ad syndicators, and advertiser's systems. In one such solution an ad created by the advertiser can be sent by a third-party advertising vendor and loaded on the host webpage in a cross-domain frame or window, and the ad can be effectively isolated from the host webpage. However, in this example, due to the isolation there may be no client-side interaction with the host page, which may limit the ad's rich functionality.

In another such solution, an ad created by the advertiser can be pulled by the ad syndicator, transformed into pure text, and loaded into the host webpage. However, in this solution, the ad may not be able to contain executable code, which can also mitigate the ad's rich functionality. Other solutions utilize ad code scanning techniques, or "blacklisting" techniques that are designed to prohibit certain functions in the host webpage. However, these solutions may not be able to cover newly developed malicious attacks, may block legitimate ads, and often require additional code installed to browsers, or other ad syndication systems.

Accordingly, one or more techniques and/or systems are disclosed herein for securely serving online ads on a host webpage, while allowing for rich media functionality of the online ads, but not the undesirable attacks by malicious third parties, for example. Further, the techniques and systems disclosed can provide for a better ad provider experience when webpage hosts update their content, as the ad content can relatively seamlessly integrate with the webpage content as intended, for example, inside a secure box that is separated from the host page content.

In one embodiment for rendering online ads on a webpage, a first inter-frame communication channel is created. The first inter-frame communication channel comprise a first communication channel between a first cross-domain frame (e.g., for securely hosting ad content) and a host page. The first cross-domain frame comprises content (e.g., ad content from an ad syndicator) from a domain that is different from that of the host page. Further, in this embodiment, a second inter-frame communication channel is created, which comprises a second communication channel between the first cross-domain frame and a second cross-domain frame (e.g., for hosting additional ad content from the same or different ad owner or syndicator) in the host page.

To the accomplishment of the foregoing and related ends, the following description and annexed drawings set forth certain illustrative aspects and implementations. These are indicative of but a few of the various ways in which one or more aspects may be employed. Other aspects, advantages,

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1A:
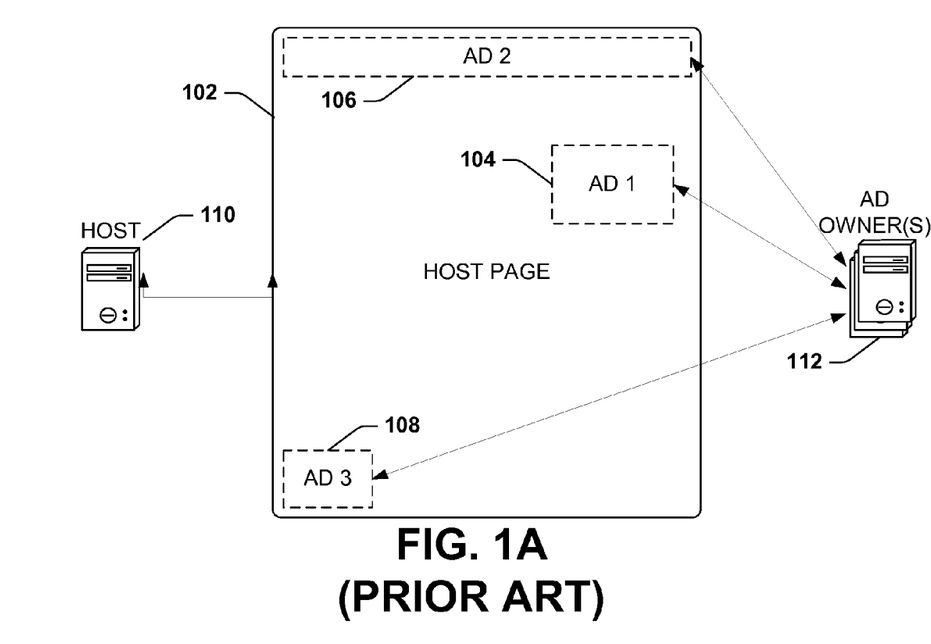
FIGS. 1A and 1B illustrate examples of existing technology used to render online advertisements.
Figure 1B:
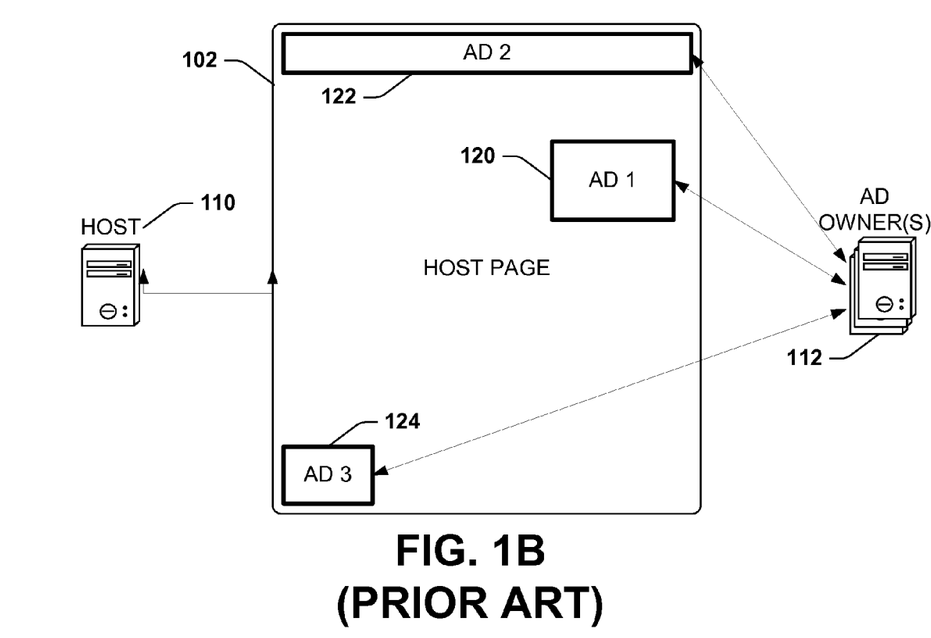

FIGS. 1A and 1B illustrate examples of existing technology used to render online advertisements. In FIGS. 1A and 1B, an online user can navigate to a website hosted by a host 110 (e.g., on a remote server), and a host webpage 102 may be rendered in a browser utilized by a user for online navigation. Further, when the host webpage 102 is rendered in the browser one or more advertisements 104, 106, 108, 120, 122, 124 may also be rendered in the browser, such as in designated areas of or over the host webpage 102.

Content displayed in the online advertisements is typically provided by one or more advertisement owners 112 (or ad network entities), for example, which are located and/or hosting the ad content remotely from the webpage host. In FIG. 1A, code for the advertisement content 104, 106, 108 is executed in the host webpage's domain, and may have the same priorities and/or privileges as the host 110 of the host webpage 102. For example, hypertext markup language (HTML) in the host webpage 110 may comprise initial script that can call to the ad owner/network 112 for an ad 104, 106, 108. In this example, when the user's client browser renders the webpage 102 the script can be executed, at which point an ad call can be made to the ad owner/network 112 for a display ad (e.g., ad content).

As an illustrative example, online display ads typically communicate their message through images, videos and interactive rich media, in standard ad unit sizes governed by the Internet Advertising Bureau (IAB). In this example, the ads, typically delivered by ad networks, are treated the same as "content" from the host publisher of the page, or operate on the same level as execution on the client browser as host content. One reason for allowing the ad content to be treated the same as the host publisher content, for example, is that advertising content has become more advanced. Script in the ad content can comprise instructions that govern rendering of the ad.

If an ad is a simple image, for example, the rendering script may be minimal. However, in some embodiments, advanced ads can provide more complex script that instruct on a position of the ad, and other activities, such as expansion, contraction, movement, and interaction with other ads on the page. For example, when a mouse over event occurs over ad content, the script may call for expansion to deploy a video. Further, as another example, ad content may spawn one or more child ad displays on the page, such as to provide rich animations and/or interactions. Allowing the ad content to run like host script facilitates these advanced renderings.

However, allowing the ad content script to run as host content can provide access to everything on the page to the ad owner, for example. Often, host webpages may comprise a user's personal information, and/or security sensitive information, such as user IDs, passwords, account numbers and more. Further, when a host webpage publisher updates their page, such as with new formatting, content, script, etc., ad content may no longer work as desired in the updated page, for example, if the script needs to interact with the publisher's script.

In FIG. 1B, a sort of "safe" ad container 120, 122, 124 can be created for ad content running on the host page 102. In this embodiment, the ad scripts cannot read the host page content, thereby providing a layer of security for the host 110. In one embodiment, the ad containers 120, 122, 124 can comprise cross-domain inline frames (iframes). A cross-domain iframe comprises a frame that is placed inline with the host page script, but is blocked from any interaction with the host script. Further, the content of the cross-domain iframe can be from a different domain than that of the host webpage.

For example, the host 110 may provide the host page 102 from a first website domain, such as hosted on the host's servers, while the content in the iframes 120, 122, 124 comes from a second domain, such as hosted on the ad owner/network servers 112. However, one problem associated with these "safe" ad containers, for example, is that the ad content may not be able to provide rich media, such as expansion, movement, spawning of children, animations, and/or interactions. As an example, the ad content may be limited to displaying merely within the boundaries of the ad container 120, 122, 124. Further, "security" provided by cross-domain frames is provided by existing browser standards. That is, for example, browsers that are currently available to the general public utilize a standard that provides for the "safe" containers. However, a browser application may be written that does not comply with these standards, and may not comprise the "security" provided by the cross-domain iframes, for example. In one example, a container may lose its functionality and/or otherwise no longer be functional in a newly written browser.

Figure 2:
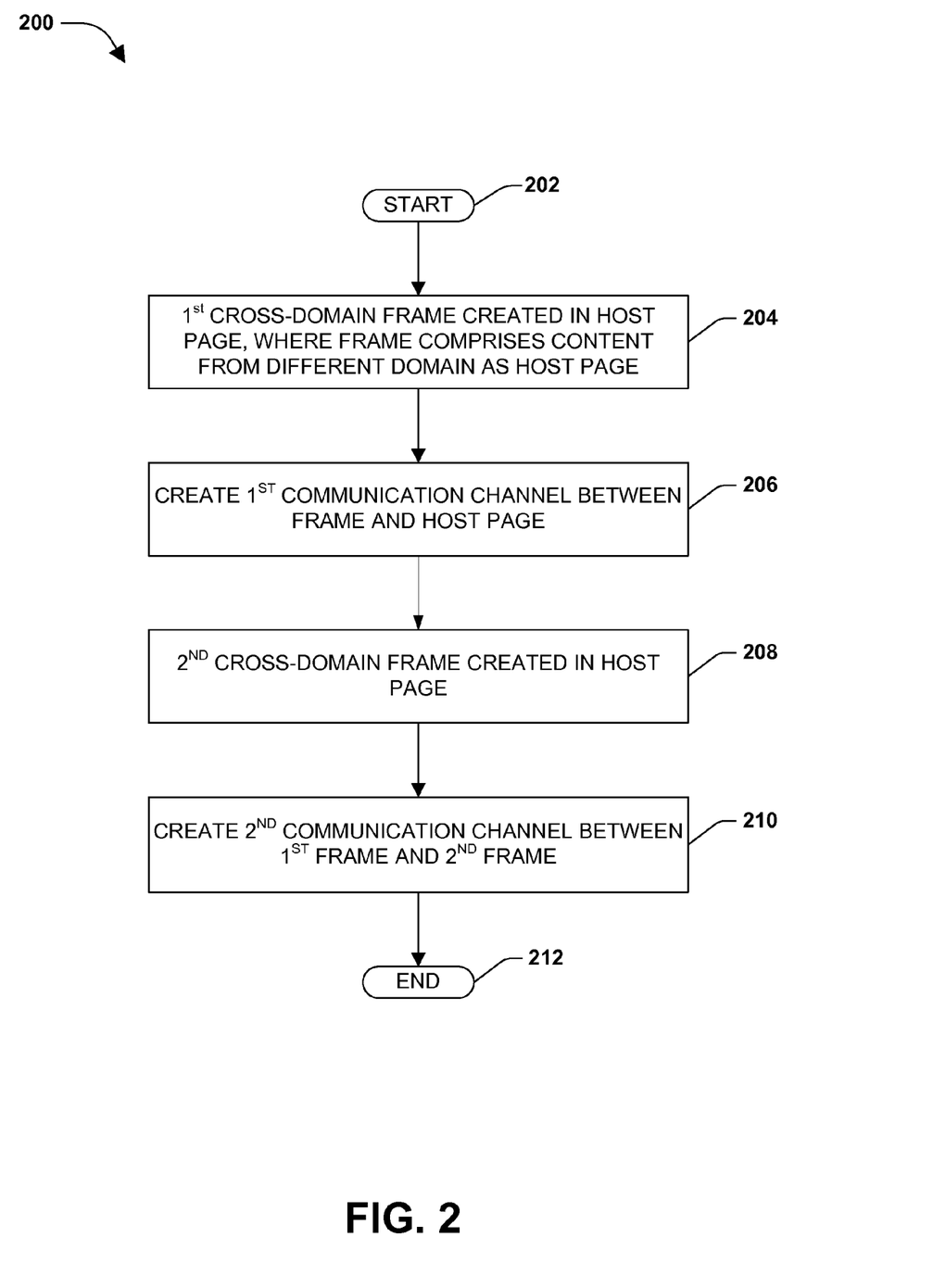
FIG. 2 is a flow diagram of at least some of an exemplary method for rendering online ads on a webpage.

Accordingly, as provided herein, a method may be devised that provides a secure environment for hosting ad content that comprises rich content, such as movement, expansion, spawning children and interactions. FIG. 2 is a flow diagram of an exemplary method 200 for rendering online ads on a webpage. The exemplary method 200 begins at 202, and a first cross-domain frame is created in a host page, at 204, where the cross-domain frame comprises content from a different domain than that of the host page. As described above, for example, the cross-domain frame can comprise an iframe where content in the iframe is prevented from interacting with the host page content.

In one embodiment, host ad space can be created in the host webpage to accommodate an initial size of the first cross-domain frame. In this embodiment, the host ad space can act as a place holder for potential ads, for example. Further, the first cross-domain frame (e.g., an inline, cross-domain frame comprising content from a different domain than that of the host webpage) can be inserted as a floating layer above the host webpage, and aligned with the host ad space. As an example, when the host webpage makes and ad call to an ad syndicator to pull an ad from an advertiser, ad content can be inserted into the first cross-domain frame, instead of directly into the host webpage.

In one embodiment, the host ad-space can comprise an initial height and width, such as corresponding to an ad-space size found in the IAB guidelines. As an example, the host webpage may create host ad-space comprising a specified width and height. In this example, the host webpage can call to an ad syndicator with the specified width and height, which can correspond to an initial width and height of an advertiser's ad content. In this way, the ad syndicator can provide merely those ads that may have an initial width and height meeting the specifications of the host webpage. In this example, the host ad-space does not contain host content, so as to avoid conflicts with ad content.

In this embodiment, for example, because the ad content is contained within the first cross-domain frame, the ad may not be granted privileges of the host webpage in the browser, thereby providing a more secure environment for the host webpage. However, if the ad content is configured to expand (e.g., upon a mouse over by a user) the first cross-domain frame may need to expand to accommodate the expanded ad content in the host webpage.

Figure 3A:
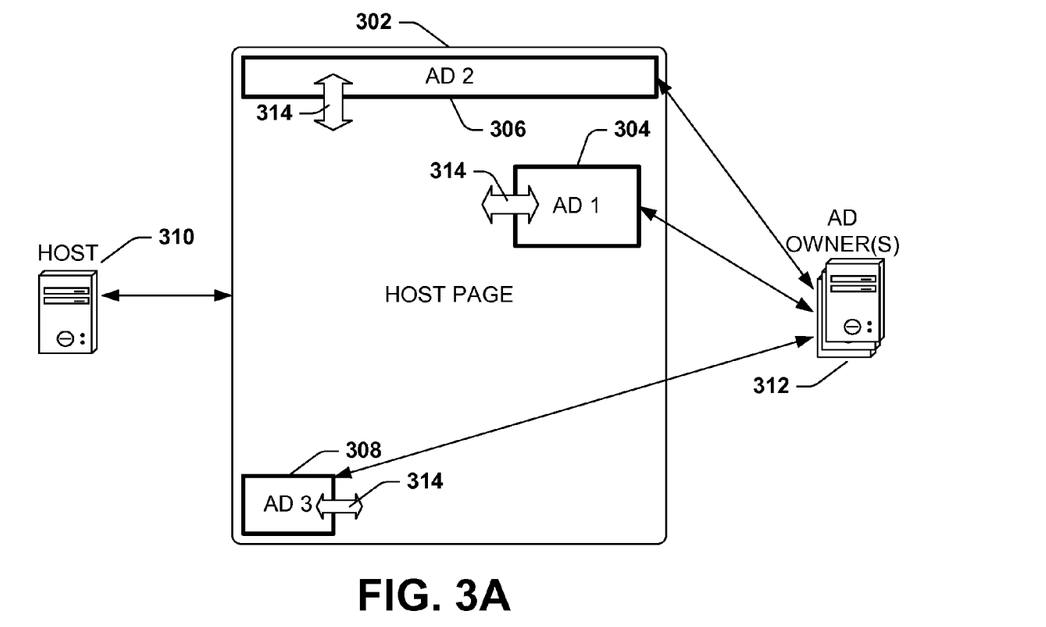
FIGS. 3A and 3B illustrate example embodiments of one or more implementations of at least some of one or more techniques and/or systems described herein.

At 206, a first inter-frame communication channel is created that comprises a first communication channel between the first cross-domain frame and the host page. As an example, as illustrated in FIG. 3A, a secure communications channel 314 may be created that allows the first cross-domain frame 304 to communicate requests (e.g., to expand or move the frame) to the host webpage 302. Upon receiving such a request, for example, the host webpage 302 can programmatically expand the first cross-domain frame 304 to accommodate expanded ad content such as from the ad owner/network 312, for example, which can float over the host 310 provided content. In this way, in this example, functionality of the ad content can be accommodated, while security of the host webpage 302 may be maintained. Further, in one embodiment, the host webpage 302 may communicate with the frame's contents (e.g., ad content), over the first communication channel, in order to configure display properties or other functionalities.

At 208 in the exemplary method 200, a second cross-domain frame is created in the host page that comprises content from a different domain than the host page. For example, referring to FIG. 3A, ad content in the first cross-domain frame 304 may make a request to the host page 302 to create a second (or third or more) frame to accommodate new content, or the host webpage may be set up to comprise more than one frame to host ad content. In this example, a second secure cross-domain frame 306 (and third 308) can be created in the host page 302. As described above, one or more second cross-domain frames can comprise secure iframes that effectively segregate host content from the ad content inside the frame. Further, in one embodiment, a first inter-frame communication channel can be created as a first communication channel 314 between the second cross-domain frame 306 and the host page 302.

Figure 3B:
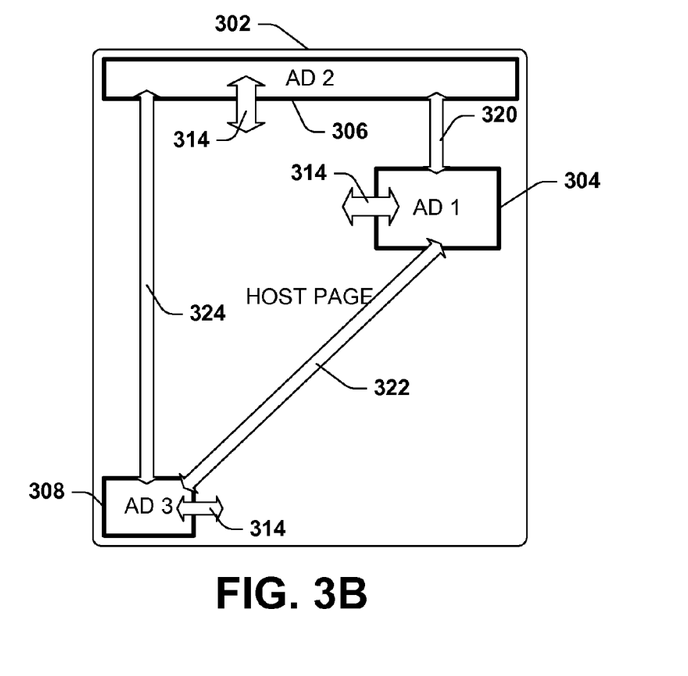

At 210 in the exemplary method 200, a second inter-frame communication channel is created that comprises a second communication channel between the first cross-domain frame and the second cross-domain frame in the host page. As an illustrative example, with reference to FIG. 3B, the second communication channel 320 can be created between the first cross-domain frame 304, comprising ad content one, and the second cross-domain frame 306, comprising ad content two (e.g., a second ad, and/or one spawned by ad one). Further, the second communication channel 322 can be created between the first cross-domain frame 304 and the third cross-domain frame 308, comprising ad content three (e.g., a third ad, and/or an ad spawned by ad one, or by ad two); and a second communication channel 324 can be created between the second cross-domain frame 306 and the third cross-domain frame 308 (e.g., and so-on, such as between additional ads created or spawned in the host page).

In one embodiment, creating a second inter-frame communication channel can comprise creating a secure communications channel that passes data, such as a communications requests, from the first cross-domain frame to the host page, then to the second cross-domain frame. Further, in this embodiment, the second cross-domain frame can communicate with the first cross-domain frame by passing communications to the host page, which passes the communications to the first cross-domain frame.

As an example, a first and second ad may both wish to run video content in their respective secure frames on the host page. However, realizing that running videos concurrently may not be an effective way to get the user's undivided attention, the ad contents may negotiate a timing of the videos. In this example, respective ads may be from different domains (or the same) and may or may not have pre-negotiated terms. Here, the ad contents can negotiate timing, or at least acknowledge the other's presence, to provide for running their desired content at different times, for example.

In another embodiment, creating a second inter-frame communication channel can comprise creating the first cross-domain frame and the second cross-domain frame where content in both frames is from the same domain. That is, for example, the first and second cross-domain frames can comprise content from the same domain, but from a different domain than the host, for example. In this embodiment, in order for the content from the first and second domains to send data over the second communication channel, a reference location in the host page for the first frame can be passed to the second frame, and vice versa.

As an example, the content from the first cross-domain frame may wish to communicate a request to interact with a second frame (e.g., spawn, expand, contract, add header space, move the second frame, etc.) in order to initiate an interactive ad with the second frame. As an illustrative example, the first frame may wish to create a second frame to pass ad content from the first frame to the second frame as an animation, such as an ad that drops a burger bun top from the first frame onto a burger in the second frame, then drops the burger and bun top from the second frame to a bottom bun in a third frame. In FIG. 2, having created the second inter-frame communications channel, the exemplary method 200 ends at 212.

In one aspect, a benefit of using the ad container(s) for hosting ad content is that they can provide for upgrade protection, compliance, etc. For example, as described above, an ad may cease to function properly when the host page is updated, as the host page content may interfere with (or not allow proper functionality with) the ad content. In one embodiment, this problem may be mitigated because the ad container can remain constant even when the host page is updated, for example, as the ad content and host content are segregated. Therefore, for example, if the ad content properly utilizes an API provided to communicate requests over an intra-frame channel, a developer does not have to worry about making ad related code work on all versions of a particular host/site. Further, in this embodiment, if the ad content is upgraded, an ad developer merely has to abide by the API in the ad container, for example. Thus, the corollary also holds such that ad content can be upgraded regardless of the state or version of the host, and vice versa.

In another aspect, utilizing the ad containers, for example, may allow a host to have "more control" over what type of ads it desires to serve on the host page. For example, on some pages the host may not want ads to expand because content next to the ad that is important for the user experience. In this example, without potential restrictions afforded by an ad container, the host page may be at the mercy of the advertiser to not have expanding ads. Accordingly, in one embodiment, the host can choose to "shut down" an API that communicates ad request for expanding ads. In one example, the ad may resultantly be clipped due to an inability of the ad container to expand even if the ad attempts to utilize the expansion API. Nevertheless, the benefit of having the user experience the content on the page may outweigh the cost of clipping the ad, and thus the ad container may be prevented from expanding.

Figure 4:
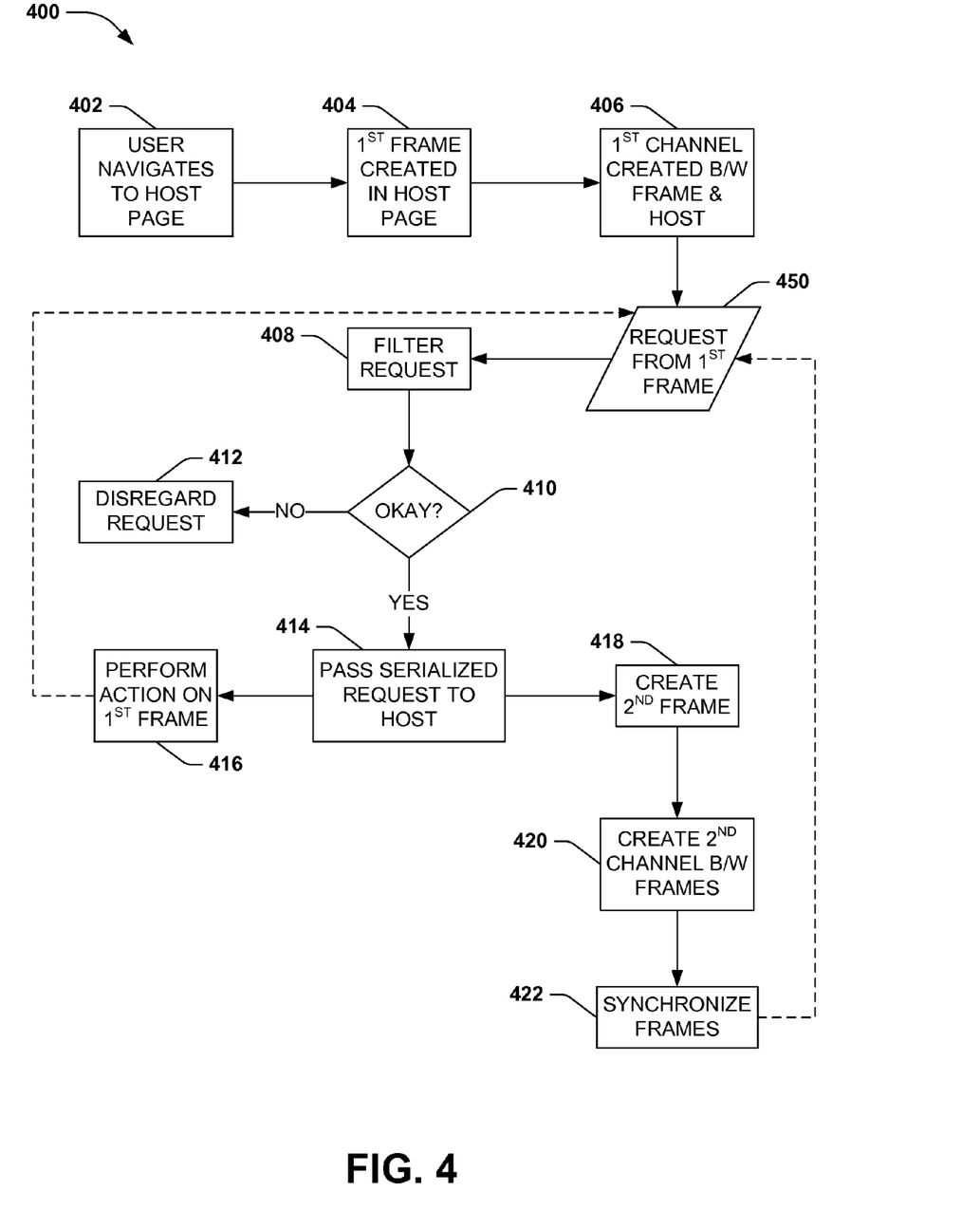
FIG. 4 is a flow diagram illustrating an embodiment of an implementation of at least some of one or more techniques described herein.

FIG. 4 is a flow diagram illustrating one embodiment 400 of an implementation of one or more techniques described herein. At 402, a user navigates to a webpage hosted by a website, such as by using a browser installed on the user's client machine. At 404, a first cross-domain frame is created in the host page, such as to accommodate a desired ad size and/or type. For example, the hosting site may have arrangements with one or more ad syndicators to provide ad space on their page for particular ad types and/or sizes. In this example, the hosting site can create the appropriate frames to accommodate the desired ad(s) from the syndicator(s).

In one embodiment, a secure cross-domain frame (e.g., an iframe) is used to isolate ad content. The website host publishes the host webpage, for example, to the Internet, which is accessed and viewed by the online user. The website host has appropriate access and privileges for the host webpage and can, in this example, render a cross-domain iframe inside (inline) the host webpage. By default, content inside the cross-domain iframe cannot interact with the host webpage, for example, creating a substantial barrier between the frame's content (e.g., ads) and the host webpage. In this way, in this embodiment, malicious attacks originating from the frame's content, for example, can be mitigated.

In this embodiment, an ad owner/syndicator/network can generate ad content that is intended to be displayed on the host webpage. As an example, the ad content generated by the ad owner can be inserted into the cross-domain iframe in the host webpage. In this way, the ad owner may merely have access to content inside the cross-domain iframe, and can be barred from interacting with the host webpage. However, at 406, a first inter-frame (e.g., cross domain) communications channel can be created between the first cross-domain frame and the host webpage, for example, to aid in the ad content rich media functionality.

In one embodiment, ad content inside the cross-domain frame (e.g., a cross-domain inline frame (iframe)) may wish to communicate with the host webpage. As an example, ad content that is configured to expand upon a specified event (e.g., a mouseover the ad content) may not be able to expand due to a fixed size of the cross-domain frame. However, in this example, if the ad content can communicate an intention to expand to the host webpage, the host webpage may programmatically expand the cross-domain frame to accommodate the expanded ad content. Additionally, the host webpage may wish to communicate across to the frame in order to control display properties or other functionalities inside the frame. As an example, the host webpage may wish to display a title bar in the frame that displays the origin of the ad content.

In this embodiment, the first inter-frame communications channel (e.g., a flash channel) can be created that allows direct transfer of data (e.g., communication) between the contents of the cross-domain frame and the host webpage. In the example embodiment 400, a request 450 can be made from the first cross-domain frame to the host. However, because security of the host webpage may still be a concern if the ad content is able to communicate with the host webpage, techniques can be employed that provide a secure inter-frame communications channel. As an example, additional code, such as one or more application programming interfaces (APIs) may be inserted on either side of the communications channel, both inside the cross-domain frame and outside the frame, in the host webpage, that provides specified security measures.

At 408, the request 450 can be filtered, such as by subjecting the communication to one or more security measures. In one embodiment of an applied security measure, merely white-listed data may be allowed to travel over the first communication channel, such as between the first cross domain frame and the host page. In this embodiment, merely those functions the code (e.g., API) deems to be "safe" may be "white-listed" (e.g., allowed to run) in the frame.

As an example, the additional code can make anonymous event handlers undetachable inside the frame, so that they cannot be changed or removed by an ads' code although they run together with the latter inside the frame. Further, in this example, JavaScript closure objects and functions can be used inside the frame. The "white-listing," in this example, has an advantage over "black-listing" of prior solutions, as there is less of an open surface (e.g., less potential methods for a malicious attack or unauthorized use of information) in "white-listing." Using "white-listing," the host webpage provides a limited list of allowable functions, whereas "blacklisting" provides a list of disallowed functions.

In another embodiment of an applied security measure, a source of data traveling over the first communication channels can be validated prior to allowing the data to cross to the host page. For example, where the domain of the first cross-domain frame is known by the host page, the source of the request, for example, can be checked against the known domain (e.g., to see if there is a match). In another embodiment, when a first cross-domain frame is created in the host webpage, a token can be planted in the first cross-domain frame, which can be used for communicating across the first communication channels. For example, secret tokens may be generated that are shared between the codes (e.g., APIs) inside and outside the frame. In this example, the code inside the frame can provide the secret token to merely "whitelisted" actions, to inhibit nefarious activity.

In another embodiment of an applied security measure, the communication sent to the host page across the first communication channels can be serialized; and the serialized communication can be treated as a non-executable string. That is, for example, a request or command sent by ad content in the first cross-domain frame is not sent as executable code, such as executable JavaScript, to the host webpage, instead the request or command can be read in series as non-executable text (e.g., and disregarded if determined to be undesirable). In this way, malicious (or unauthorized) code is less likely to be executed in the host webpage merely by sending it across the communication channel.

It will be appreciated that, while several examples of security measures have been discussed herein, the techniques described in these embodiments are not limited to any particular security measures. Those skilled in the art may devise additional methods and means for providing security. For example, the additional code (e.g., APIs) can send heart-beat messages across the channel to monitor the condition of the frame, to determine if the security code or measures inside the frame are deactivated (e.g., when code attempts to maliciously navigate the domain of the frame away to another domain).

At 410, in the exemplary embodiment 400, if the request from the first cross-domain frame does not pass the desired security measures for the first communications channel (NO at 410), the request is ignored and/or discarded, at 412. However, if the request from the first cross-domain frame passes the desired security measures for the first communications channel (YES at 410), the request can be serialized and passed to the host webpage, at 414, as described above.

As described above, in one embodiment, the first inter-frame communication channel can be secured by using a list of allowed functionalities for content inside the first cross-domain frame. In the example embodiment 400, the serialized request may comprise one or more functionalities from a list of allowed functionalities, which can comprise: one or more frame display properties (e.g., size, shape, location); one or more frame utilities (e.g., what goes on in the frame, interactions with other frames); and/or one or more frame user interface functionalities (e.g., performing an action based on a user action), for example.

In response to a request originating from the first cross-domain frame, the host webpage performs an action on the first cross-domain frame, at 416. In one embodiment, the response can comprise resizing the first cross-domain frame within the host page, such as to accommodate expanded add content (e.g., a video); moving a cross-domain frame within the host page, such as to follow the user's movements within the page; broadcasting a message to one or more cross-domain frames, such as to negotiate or synchronize content; and/or closing a cross-domain frame, such as after a desired content is displayed.

In another embodiment, the request 450 across the first communications channel from the content in the first cross-domain frame can comprise creating one or more second cross-domain frames, at 418; and the response can comprise spawning a child cross-domain frame within the host page. In one embodiment, the request 450 may comprise creating a plurality of second cross-domain frames, for example, thereby spawning a plurality of child frames in the host page. For example the ad content in the first cross-domain frame may wish to provide a rich interactive media experience to the user to imprint a brand on the user. In this example, the plurality of ads can interact with each other across the page, in conjunction with the host page content.

At 420, a second inter-frame communications channel is created, such as between the first and second (e.g., and third, etc.) cross-domain frames in the host page. As described above, the second communications channel can allow the content in respective secure frames to pass data (e.g., communicate) between each other. Further, in one or more embodiments, the security measures described above for the first inter-frame communications channel can also be applied to the second communication channel, selectively. In particular, for example, when the second communications channel routes data through the host webpage to be exchanged with one or more frames, the described security measures may be applied.

At 422 in the exemplary embodiment 400, the first and second cross-domain frames (e.g., and third, etc.) can synchronize with each other, such as across the second communications channel, to provide coordinated rendering of one or more online ads. In one embodiment, the request, such as 450, may comprise a synchronization request, and the response can provide for synchronizing content between two or more cross-domain frames. For example, synchronizing can comprise negotiating display of content between two competing ads, or providing rich media interaction between two or more ads.

In one embodiment, as an illustrative example, when two or more ads from a same domain are communicating with each other, such as to synchronize ad content (e.g., provide rich interaction), some security measures may or may not be applied. In this example, the ads can communicate in the same domain without compromising security, as they are both securely segregated from the host page content in the ad containers. One reason for relaxing security for this type of communication between ads is because a security "whitelist" of functionalities may not be able to accommodate every way that ads can be written to communicate with one other. Where an ad is communicating with another ad from a different domain, it may be less desirable, however, to relax security measures, for example.

In one embodiment, the process can iterate, for example, where next request 450 can comprise requesting creation of a third cross-domain frame. Further, the respective cross-domain frames created in the host page can send requests across the first communications channel to the host page, for example, where a second or third frame wishes to expand or spawn a child frame.

Figure 5:
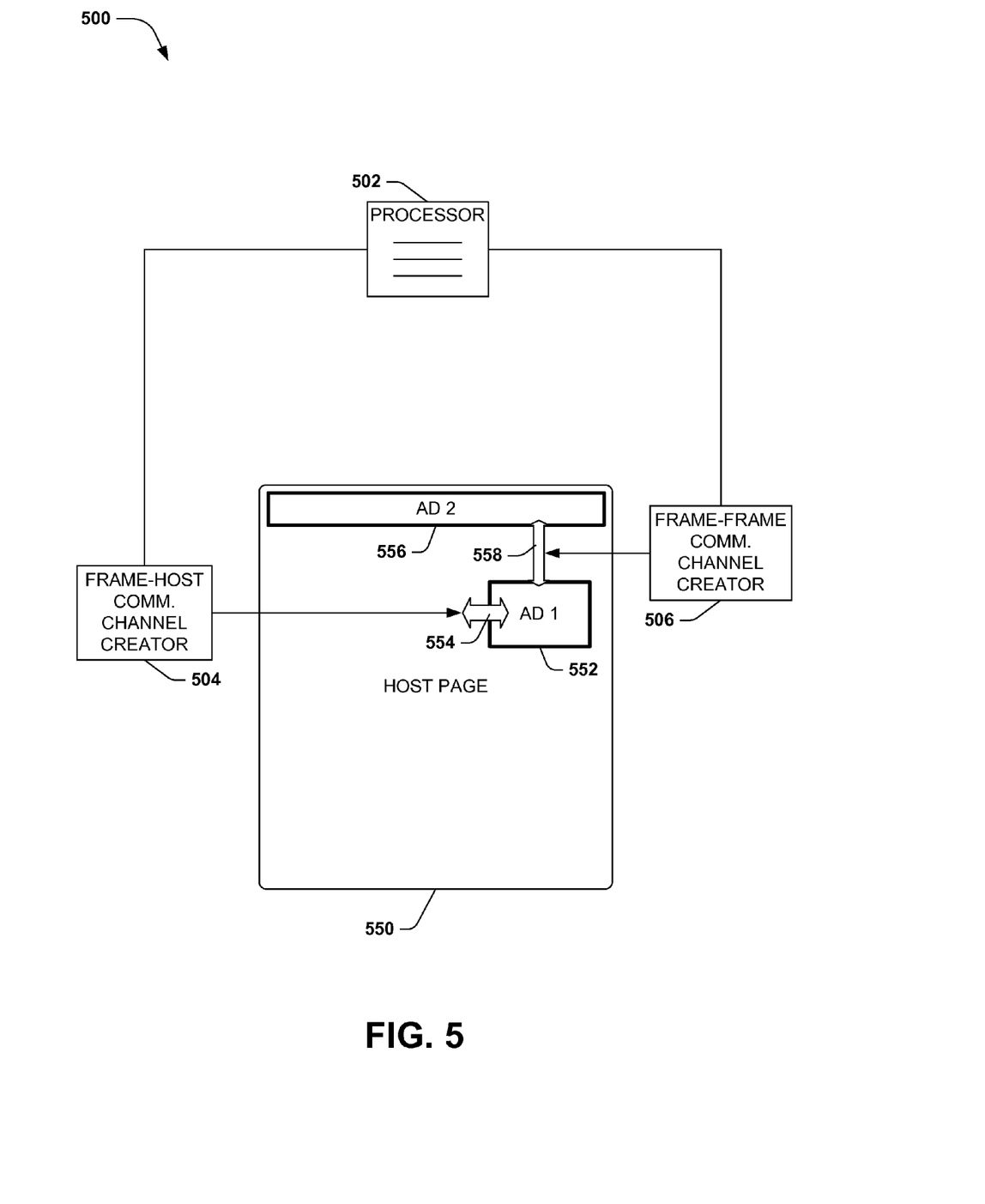
FIG. 5 is a component diagram of at least some of an exemplary system for coordinating online ad content on a host page.

A system may be devised that provides a secure environment for hosting ad content that comprises rich content, such as movement, expansion, spawning children and interactions. FIG. 5 is a component diagram of an exemplary system 500 for coordinating online ad content on a host page. A processor 502 (e.g., a computer-based processor) processes data for the system, and is operably coupled with a frame-host communication channel creation component 504. The frame-host communication channel creation component 504 creates a frame-host communication channel 554 between the host page 550 and a first cross-domain frame 552 hosted in the host page 550. A frame-frame communication channel creation component 506 is also operably coupled with the processor, and it creates a frame-frame communication channel 558 between the first cross-domain frame 552 and a second cross-domain frame 556 hosted in the host page 550.

Figure 6:
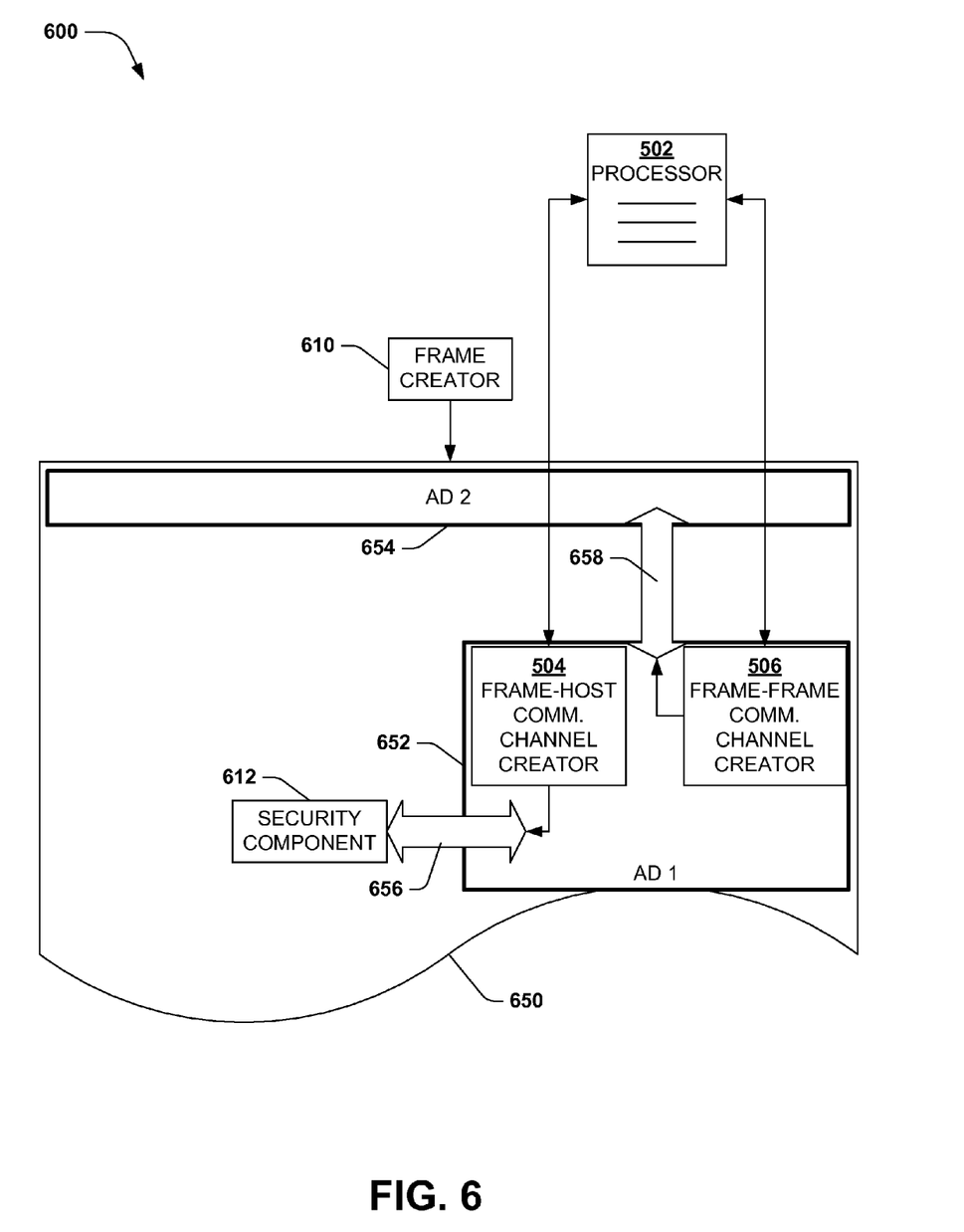
FIG. 6 is a component diagram illustrating an example embodiment of an implementation of at least some of one or more systems described herein.

FIG. 6 is a component diagram illustrating an example embodiment 600 of an implementation of one or more systems described herein. The system in the example embodiment 600 comprises a frame creation component 610 that can create a cross-domain frame 652, 654 in the host page 650. The frame creation component 610 can create a cross domain frame that comprises content from a first domain, where the host page 650 comprises content from a second domain. That is, for example, the frame creation component 610 may create a plurality of cross-domain frames respectively having different domains from each other and the host page, and/or create a plurality of cross-domain frames where some or all comprise a same domain, which is different from the host page domain.

In one embodiment, the first cross-domain frame 652 can comprise the frame-host communication channel creation component 504, which can be activated by content in the first cross-domain frame 652. For example, the frame creation component 610 can create the first cross-domain frame 652 with the frame-host communication channel creation component 504 inside the frame. In this example, when the host webpage calls for an ad syndicator to load ad content, the loading of the content, and/or an action by the content, can activate the frame-host communication channel creation component 504 to create the frame-host communication channel 656 between the host page 650 and a first cross-domain frame 652.

In one embodiment, the first cross-domain frame 652 can comprise the frame-frame communication channel creation component 506, which can be activated by content in the first cross-domain frame 652. For example, the frame creation component 610 can create the first cross-domain frame 652 with the frame-frame communication channel creation component 506 inside the frame. In this example, after (or concurrent with) the second cross-domain frame is created, an action by the content can activate the frame-frame communication channel creation component 506 to create the frame-frame communication channel 658 between the first cross-domain frame 652 and a second cross-domain frame 654.

In one embodiment, the frame-frame communication channel 658 can pass data (e.g., communications) from the first cross-domain frame 652 to the second cross-domain frame 654 (or vice versa) through the host page 650. In another embodiment, the frame-frame communication channel 658 can pass data (e.g., communications) from the first cross-domain frame 652 to the second cross-domain frame 654 (or vice versa) in a same domain. In this embodiment, the content from the first cross-domain frame 652 and content from the second cross-domain frame 654 are comprised in the same domain.

In one embodiment, where the first and second cross-domain frames 652, 654 respectively comprise content from the same domain, the frame-frame communication channel creation component 506 can pass a reference for the content from the second cross-domain frame 654 to the first cross-domain frame 652. Further, the frame-frame communication channel creation component 506 can pass a reference for the content from the first cross-domain frame 652 to the second cross-domain frame 654. In this way, for example, the respective cross-domain frames from the same domain can effectively communicate with each other, for example, in the domain, without crossing to the host page.

In the example embodiment 600, a security component 612 can filter requests across the frame-host communication channel 656 originating from inside the cross-domain frame 652 in the host page 650. In another embodiment, the security component 612 can also filter requests across the frame-frame communication channel 658 between the cross-domain frames 652, 654 in the host page 650.

In another embodiment, a security component 614 can be disposed inside the ad container. For example, the frame creation component 610 can create the first cross-domain frame 652 with the security component 614 disposed in the frame. Placing the security component inside the frame, for example, may mitigate cross-site-scripting attacks, which can be done using the ad container. As an illustrative embodiment, a hacker may load random content using the ad container hosted on a cross-domain for purposes other than serving ads on the host page 650. In this example, the security component 614 inside the ad container can check whether the request is coming from the host and/or whether the commands are whitelisted, etc.

The security component 612 can comprise a white-list comparison component (not shown) that allows merely white-listed data to travel over the frame-host communication channel 656 (or frame-frame communications channel 658). Further, the security component 612 can comprise a validation component (not shown) that validates a source of data traveling over the frame-host communication channel 656 (or frame-frame communications channel 658) prior to allowing the data to cross to the host page 650.

Additionally, the security component 612 can comprise a token utilization component (not shown) that plants a token in a cross-domain frame 652, 654 created in the host page 650, and merely allows data that has the token to travel over the frame-host communication channel (or frame-frame communications channel 658). The security component 612 can also comprise a serialization component (not shown) that serializes the communication to the host page across the frame-host communication channel (or frame-frame communications channel 658), and configures the communication to the host page 650 across the frame-host communication channel (or frame-frame communications channel 658) as a non-executable string.

Figure 7:
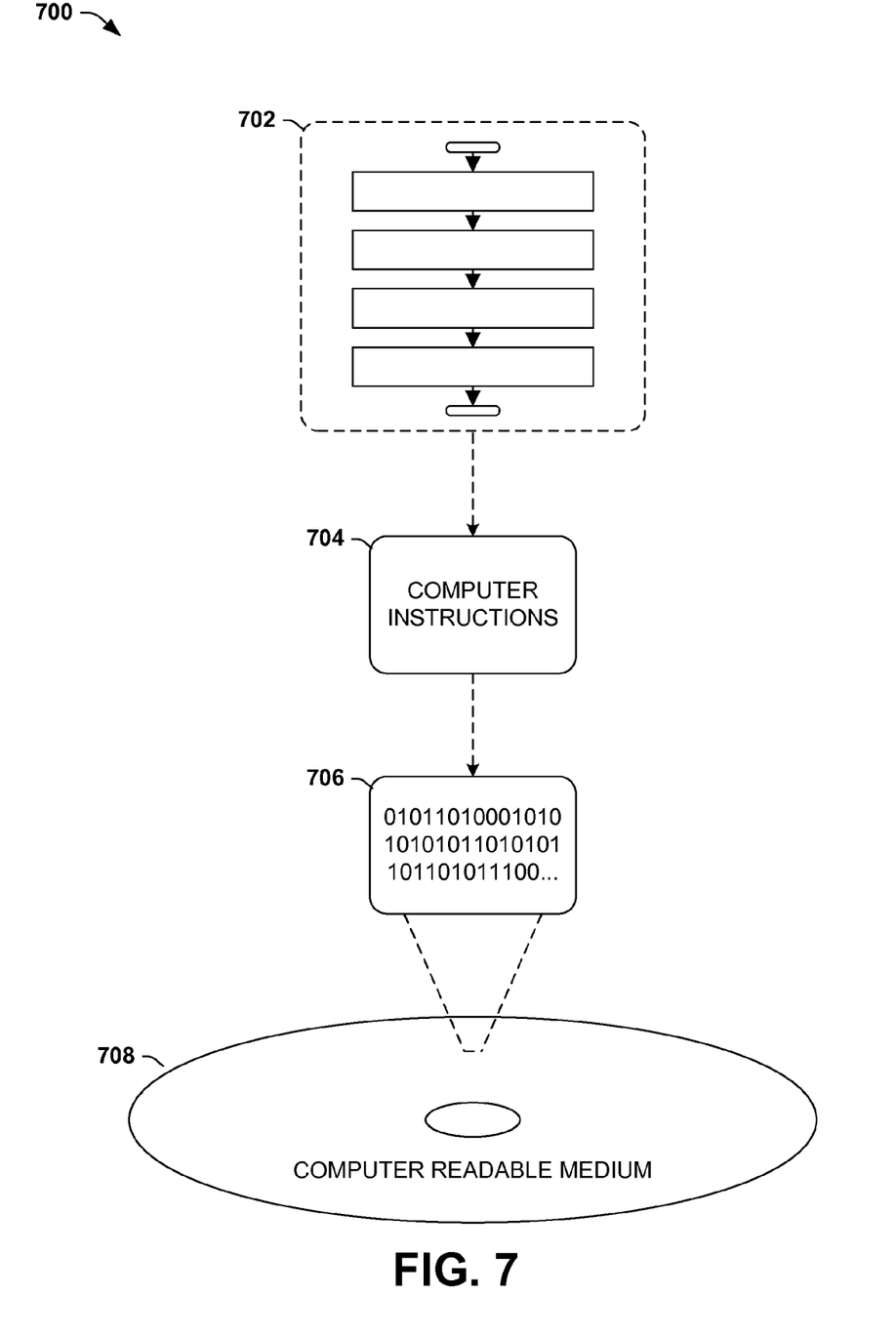
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 200 of FIG. 2, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
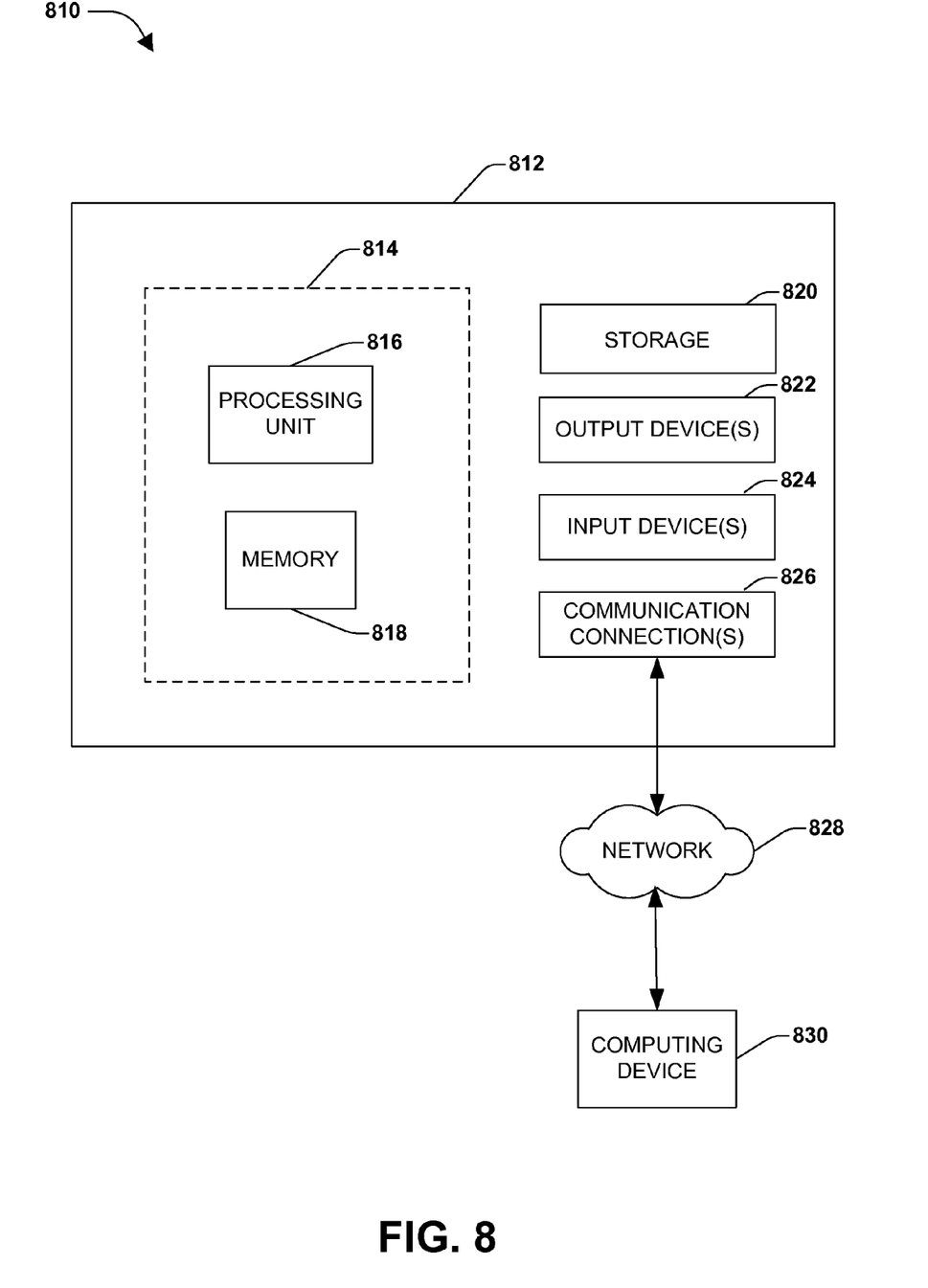
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

What is claimed is:

1. A computer-based method comprising:
creating a first inter-frame communication channel between a first cross-domain frame placed within a host page and the host page, the first cross-domain frame comprising content received from a first domain different than a domain of the host page; and
creating a second inter-frame communication channel between the first cross-domain frame and a second cross-domain frame placed within the host page, the second cross-domain frame comprising content received from a second domain different than the domain of the host page, wherein the second inter-frame communication channel is used to communicate a request to interact between the first cross-domain frame and the second cross-domain frame to initiate an interactive ad associated with the first cross-domain frame and the second cross-domain frame, the interactive ad comprising ad content passing over the second inter-frame communication channel from at least one of the first cross-domain frame to the second cross-domain frame or the second cross-domain frame to the first cross-domain frame as at least part of an animation.

2. The method of claim 1, the first domain being different than the second domain.

3. The method of claim 1, comprising at least one of:
creating the first cross-domain frame; or
creating one or more second cross-domain frames in the host page.

4. The method of claim 1, the first cross-domain frame is not nested within the second cross-domain frame, the second cross-domain frame is not nested within the first cross-domain frame.

5. The method of claim 1, comprising allowing merely white-listed data to travel over at least one of the first inter-frame communication channel or the second inter-frame communication channel.

6. The method of claim 1, comprising validating a source of data traveling over at least one of the first inter-frame communication channel or the second inter-frame communication channel.

7. The method of claim 1, comprising planting a token in at least one of the first cross-domain frame or the second cross-domain frame that is used for communicating across at least one of the first inter-frame communication channel or the second inter-frame communication channel.

8. The method of claim 1, comprising at least one of:
serializing a first communication to the host page across the first inter-frame communication channel; or
treating a second communication to the host page across the first inter-frame communication channel as a non-executable string.

9. The method of claim 1, the first domain not different than the second domain.

10. The method of claim 1, comprising synchronizing the first cross-domain frame and the second cross-domain frame.

11. The method of claim 1, comprising at least one of:
securing the first inter-frame communication channel using a first list of allowed functionalities for content inside the first cross-domain frame;
securing the second inter-frame communication channel using a second list of allowed functionalities for content inside the first cross-domain frame; or
securing the second inter-frame communication channel using a third list of allowed functionalities for content inside the second cross-domain frame.

12. The method of claim 11, at least one of the securing the first inter-frame communication channel using the first list, the securing the second inter-frame communication channel using the second list, or the securing the second inter-frame communication channel using the third list performed based upon at least one of:

one or more frame display properties;
one or more frame utilities; or
one or more frame user interface functionalities.

13. The method of claim 1, comprising at least one of:
resizing a cross-domain frame within the host page;
moving a cross-domain frame within the host page;
spawning a child cross-domain frame within the host page;
synchronizing content between two or more cross-domain frames;
broadcasting a message to one or more cross-domain frames; or
closing a cross-domain frame.

14. A system comprising:
a processing unit implemented at least in part via hardware and configured to process data for the system;
a frame-host communication channel creation component configured to create a frame-host communication channel between a host page and a first cross-domain frame placed within the host page; and
a frame-frame communication channel creation component configured to create a frame-frame communication channel between the first cross-domain frame and a second cross-domain frame placed within the host page, where the frame-frame communication channel is used to communicate a request for interaction between the first cross-domain frame and the second cross-domain frame to initiate an interactive ad associated with at least one of the first cross-domain frame or the second cross-domain frame, the interactive ad comprising ad content passing over the second inter-frame communication channel from at least one of the first cross-domain frame to the second cross-domain frame or the second cross-domain frame to the first cross-domain frame.

15. The system of claim 14, comprising a frame creation component configured to create a cross-domain frame in the host page.

16. The system of claim 14, at least one of:
the frame-host communication channel creation component configured to be activated by content in the first cross-domain frame; or
the frame-frame communication channel creation component configured to be activated by content in the first cross-domain frame.

17. The system of claim 14, comprising a security component configured to filter requests across the frame-host communication channel, the security component comprising at least one of:
a white-list comparison component configured to allow merely white-listed data to travel over the frame-host communication channel;
a validation component configured to validate a source of first data traveling over the frame-host communication channel prior to allowing the first data to cross to the host page;
a token utilization component configured to at least one of:
plant a token in a cross-domain frame created in the host page; or
merely allow data comprising the token to travel over the frame-host communication channel; or
a serialization component configured to one or more at least one of:
serialize a first communication to the host page across the frame-host communication channel; or
configure a second communication to the host page across the frame-host communication channel as a non-executable string.

18. The system of claim 14, the frame-frame communication channel configured to pass the request through the host page.

19. The system of claim 14, the frame-frame communication channel creation component configured to at least one of:
pass a first reference for first content from the first cross-domain frame to the second cross-domain frame; or
pass a second reference for second content from the second cross-domain frame to the first cross-domain frame.

20. A computer readable storage medium comprising instructions that when executed perform a method comprising:
creating a first inter-frame communication channel between a first cross-domain frame in a host page and the host page; and
creating a second inter-frame communication channel between the first cross-domain frame and a second cross-domain frame in the host page, wherein the second inter-frame communication channel is used to communicate a request to interact, between the first cross-domain frame and the second cross-domain frame, to initiate an interactive ad, the interactive ad comprising ad content passing over the second inter-frame communication channel from at least one of the first cross-domain frame to the second cross-domain frame or the second cross-domain frame to the first cross-domain, the interactive ad comprising an animation.

* * * * *